(12) United States Patent
Haba et al.

(10) Patent No.: US 9,096,435 B2
(45) Date of Patent: Aug. 4, 2015

(54) PROCESS FOR PRODUCTION OF CARBON NANOTUBE

(75) Inventors: Eisuke Haba, Tsukuba (JP); Suguru Noda, Tokyo (JP); Kei Hasegawa, Tokyo (JP)

(73) Assignees: HITACHI CHEMICAL COMPANY, LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 13/881,732

(22) PCT Filed: Oct. 26, 2011

(86) PCT No.: PCT/JP2011/074720
§ 371 (c)(1),
(2), (4) Date: Jul. 9, 2013

(87) PCT Pub. No.: WO2012/057229
PCT Pub. Date: May 3, 2012

(65) Prior Publication Data
US 2013/0287674 A1   Oct. 31, 2013

(30) Foreign Application Priority Data
Oct. 26, 2010 (JP) ................................ P2010-239584

(51) Int. Cl.
| | |
|---|---|
| *C01B 31/02* | (2006.01) |
| *B01J 23/745* | (2006.01) |
| *B01J 37/02* | (2006.01) |
| *B82Y 30/00* | (2011.01) |
| *B82Y 40/00* | (2011.01) |
| *B01J 21/04* | (2006.01) |

(52) U.S. Cl.
CPC ........... *C01B 31/0226* (2013.01); *B01J 23/745* (2013.01); *B01J 37/0215* (2013.01); *B82Y 30/00* (2013.01); *B82Y 40/00* (2013.01); *C01B 31/0233* (2013.01); *B01J 21/04* (2013.01)

(58) Field of Classification Search
CPC ...... B01J 23/745; B01J 37/0215; B01J 21/04; B82Y 30/00; B82Y 40/00; C01B 31/0226; C01B 31/0233
USPC ............ 423/447.1, 447.3; 977/742, 743, 842, 977/843
See application file for complete search history.

(56) References Cited

FOREIGN PATENT DOCUMENTS

| | | |
|---|---|---|
| CN | 1344674 A | 4/2002 |
| EP | 2383225 A1 * | 11/2011 |

(Continued)

OTHER PUBLICATIONS

Sumio Iijima, helical microtubules of graphitic carbon, Letters to Nature, Nov. 7, 1991, pp. 56-58, vol. 354.

(Continued)

*Primary Examiner* — Richard M Rump
(74) *Attorney, Agent, or Firm* — Fitch, Even, Tabin and Flannery LLP

(57) ABSTRACT

The present invention relates to a method for producing carbon nanotubes, comprising a synthesis step of synthesizing carbon nanotubes on a support on which a catalyst is supported by flowing a source gas consisting of acetylene, carbon dioxide, and an inert gas over the support, wherein in the source gas, a partial pressure of the acetylene is $1.33 \times 10^1$ to $1.33 \times 10^4$ Pa, a partial pressure of the carbon dioxide is $1.33 \times 10^1$ to $1.33 \times 10^4$ Pa, and a partial pressure ratio of the acetylene to the carbon dioxide (acetylene/carbon dioxide) is in the range of 0.1 to 10.

8 Claims, 2 Drawing Sheets

(56) References Cited

FOREIGN PATENT DOCUMENTS

| | | |
|---|---|---|
| JP | 2002-201013 | 7/2002 |
| JP | 2006-315891 | 11/2006 |
| WO | WO 2010/076885 A1 | 7/2010 |

OTHER PUBLICATIONS

Hongjie Dai et al., Single-wall nanotubes produced by metal-catalyzed disproportionation of carbon monoxide, Chemical Physics Letter 260, Sep. 27, 1996, pp. 471-475.

Riichiro Saito et al., Basic and application of carbon nanotubes, Baifukan Co., Ltd., Mar. 31, 2004, pp. 6-7.

Suguru Noda et al., Millimeter-Thick Single-Walled Carbon Nanotube Forest: Hidden Role of Catalyst Support, Japanese Journal of Applied Physics, 2007, pp. L399-L401, vol. 46, No. 17.

Don N. Futaba et al., General Rules Governing the highly Efficient Growth of Carbon Nanotubes, Advanced Materials, Dec. 18, 2009, pp. 4811-4815, vol. 21, No. 47.

Arnaud Magrez et al., Evidence of an Equimolar $C_2H_2$—$CO_2$ Reaction in the Synthesis of Carbon Nanotubes, Angewandte Chemie International Edition, 2007, 46/3, pp. 441-444.

English translation of International Preliminary Report on Patentability of International Appln. PCT/JP2011/074720 dated May 23, 2013.

EP Search Report of Appln. No. 11836362.1 dated Feb. 17, 2014 in English.

Seo, et al., Topical Review, Catalytically Grown Carbon Nanotubes: from Synthesis to Toxicity, Journal of Physics D. Applied Physics, vol. 40, No. 6, Mar. 21, 2007, pp. R109-R120.

Magrez et al., Low-Temperature, Highly Efficient Growth of Carbon Nanotubes on Functional Materials by an Oxidative Dehydrogenation Reaction, ACS Nano, vol. 4, No. 7, Jul. 27, 2010, pp. 3702-3708.

CN Office Action of Appln. No. 201180048983.0 dated Jun. 9. 2014.

* cited by examiner

PROCESS FOR PRODUCTION OF CARBON NANOTUBE

TECHNICAL FIELD

The present invention relates to a method for producing carbon nanotubes.

BACKGROUND ART

A carbon nanotube is a material having a structure in which a graphene sheet is rolled into a cylindrical shape and having a one-dimensional structure having a very large aspect ratio (see Non Patent Literature 1). The carbon nanotube is known to have mechanically excellent strength and flexibility, semi-conducting and metallic conductivity, and further, chemically very stable properties. For methods for producing carbon nanotubes, an arc discharge method, a laser vaporization method, a chemical vapor deposition method (hereinafter referred to as a CVD method), and the like have been reported. Particularly, the CVD method is a synthesis method that receives attention as a synthesis method suitable for mass synthesis, continuous synthesis, and higher purity (for example, see Non Patent Literature 2).

Particularly, it has been confirmed that single-walled carbon nanotubes (hereinafter referred to as "SWCNTs") exhibit metallic properties or semiconducting properties depending on the way of rolling and their diameter, and their applications to electrical and electronic devices and the like have been expected. For the synthesis of SWCNTs, a catalytic CVD method for growing nanotubes (for example, see Non Patent Literature 3) has become mainstream. This catalytic CVD method uses nanoparticles of a metal as a catalyst. And, while a carbon source which is a gas is fed, the carbon source is pyrolyzed at high temperature to grow nanotubes from the nanoparticles of a metal which is the catalyst.

CITATION LIST

Non Patent Literature

Non Patent Literature 1: S. Iijima, Nature 354, 56 (1991).
Non Patent Literature 2: "Basics and Applications of Carbon nanotubes" jointly edited by Riichiro Saito and Hisanori Shinohara, BAIFUKAN, 2004
Non Patent Literature 3: H. Dai, A. G. Rinzler, P. Nikolaev, A. Thess, D. T. Colbert, and R. E. Smalley, Chem. Phys. Lett. 260, 471 (1996).

SUMMARY OF INVENTION

Technical Problem

In a case of using acetylene as the carbon source in the catalytic CVD method, when the acetylene is at low concentration, carbon nanotubes can be grown, but the amount of the source fed is small, which is not suitable for mass production, and it takes time to obtain long carbon nanotubes. On the other hand, when the acetylene is set at high concentration, it promotes the carbonization deactivation of the catalyst, and the growth of carbon nanotubes stops, and therefore, again, long carbon nanotubes are not obtained. As means for suppressing the carbonization deactivation of a catalyst, a method of adding water in a slight amount is known, but problems are that precise control of the amount of water added is required, and moreover, the suppression of catalyst deactivation when acetylene is set at high concentration is insufficient.

The present invention has been made based on the technical background as described above, and it is an object of the present invention to provide a method for producing carbon nanotubes in which it is possible to effectively suppress catalyst deactivation even upon feeding acetylene at high concentration, and to efficiently produce long carbon nanotubes.

Solution to Problem

In order to achieve the above object, the present invention provides a method for producing carbon nanotubes in which, using acetylene and a catalyst for producing carbon nanotubes from the acetylene, the carbon nanotubes are synthesized on a support in a heated state, disposed in a reactor, the method comprising a synthesis step of synthesizing the carbon nanotubes on the support on which the catalyst is supported by flowing a source gas comprising the acetylene, carbon dioxide, and an inert gas over the support, wherein in the source gas, a partial pressure of the acetylene is $1.33 \times 10^1$ to $1.33 \times 10^4$ Pa, a partial pressure of the carbon dioxide is $1.33 \times 10^1$ to $1.33 \times 10^4$ Pa, and a partial pressure ratio of the acetylene to the carbon dioxide (acetylene/carbon dioxide) is in the range of 0.1 to 10.

According to such a production method, by using the source gas consisting of the acetylene, carbon dioxide, and an inert gas, and controlling the partial pressure of the acetylene and the carbon dioxide in the source gas, and their partial pressure ratio in the above ranges, it is possible to effectively suppress catalyst deactivation even upon feeding the acetylene at high concentration, and to efficiently produce long carbon nanotubes.

For a reason why these effects are obtained, the present inventors presume as follows. It is considered that the stop of the growth of carbon nanotubes during CVD is caused by the coarsening of catalyst particles due to Ostwald ripening. It is considered that the addition of carbon dioxide suppresses the surface diffusion of catalyst atoms and prevents the coarsening of catalyst particles, and as a result, stable long carbon nanotubes are obtained. In addition, in the method for producing carbon nanotubes according to the present invention, slight amount control is not necessary because it is possible to feed carbon dioxide at high concentration unlike water, and to effectively suppress catalyst deactivation even upon setting acetylene at high concentration, which can provide conditions preferred for mass production.

In the method for producing carbon nanotubes according to the present invention, it is preferred that in the above source gas, the partial pressure of the acetylene is $6.67 \times 10^1$ to $6.67 \times 10^3$ Pa and the partial pressure of the carbon dioxide is $6.67 \times 10^1$ to $6.67 \times 10^3$ Pa. Thus, it is possible to grow the carbon nanotubes to a length of 300 μm or more in a short time while reducing a change in average diameter to 2 nm or less.

In the method for producing carbon nanotubes according to the present invention, it is preferred to set the synthesis time of the carbon nanotubes to 1 minute or more in the above synthesis step. Thus, it is possible to grow the carbon nanotubes to 300 μm or more from the same catalyst and to set the yield of the carbon nanotubes with respect to the catalyst to 10,000 times or more in terms of a volume ratio.

In the method for producing carbon nanotubes according to the present invention, it is preferred that the support is a structure having one shape selected from among a powder form, a bead form, a honeycomb form, a porous form, a fiber form, a tube form, a wire form, a net form, a lattice form, a sponge form, a plate form, and a layer form. When the support is in such a shape, the support can be applied to various reactor forms in methods for the producing carbon nanotubes, such as a substrate method and a fluidized bed method.

[Definition of Terms]

Terms used in the description and claims of the present invention will be defined.

A "carbon nanotube" refers to a fine structure having a structure in which a graphene sheet is rolled into a cylindrical shape.

A "support" is a structure for holding a catalyst, a catalyst carrier (carrier layer) (specific examples will be described later), and the like in a reactor, and is made of a solid material. The catalyst can be supported, for example, by gasifying the source of the catalyst and bringing the gas source into contact with the support. Alternatively, the catalyst can be supported on the support by attaching the source of the catalyst to the support and heat-treating them.

A "catalyst" is one supported on a support and means a general catalyst. In synthesizing carbon nanotubes by feeding acetylene to the "catalyst", the "catalyst" serves the functions of the mediation, promotion, efficiency, and the like of the synthesis of carbon nanotubes, and thus, carbon nanotubes are synthesized from the acetylene. In addition, carbon nanotubes are synthesized by the functions of the "catalyst. The "catalyst" means a material having the role of taking in acetylene and discharging carbon nanotubes. Further, the "catalyst" means nanoparticles having a size on the order of nanometers.

A "catalyst carrier" (carrier layer) is a material to which nanoparticles of a catalyst are attached. The "catalyst carrier" is formed on a support, and a catalyst which is nanoparticles of a metal is supported on the "catalyst carrier." The support can also serve the function of the catalyst carrier.

"The synthesis of carbon nanotubes" refers to carbon growing while making a tubular structure on a catalyst. As a synonym for the synthesis of carbon nanotubes, "the growth of carbon nanotubes" is used.

A "source gas" refers to a mixed gas consisting of acetylene, carbon dioxide, and an inert gas (carrier gas).

A "reactor" is an apparatus in which a support is disposed, and is an enclosed apparatus to which a feed pipe for feeding gas flows, such as the source of a catalyst carrier, the source of a catalyst, a source gas comprising acetylene, a carrier gas, and a separation gas, and a emission pipe for a gas flow after synthesis being emitted are connected.

Advantageous Effects of Invention

According to the present invention, it is possible to provide a method for producing carbon nanotubes which enables catalyst deactivation to be effectively suppressed even upon feeding acetylene at high concentration, and enables long carbon nanotubes to be efficiently produced.

DESCRIPTION OF EMBODIMENT

Figure 1:
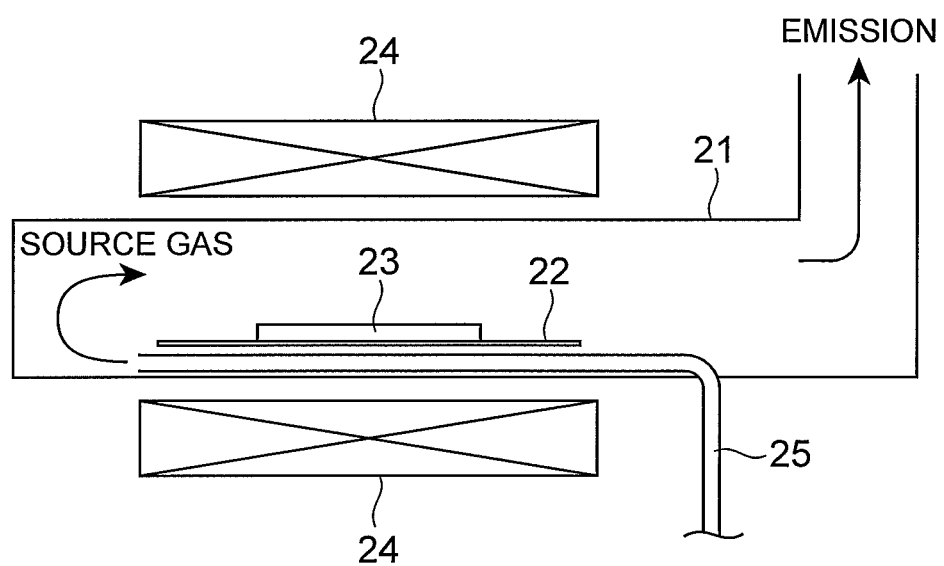
FIG. 1 is a schematic diagram showing the outline of a production apparatus according to a method for producing carbon nanotubes in an embodiment of the present invention.

A preferred embodiment of the present invention will be described below in detail, referring to the drawings in some cases. In the drawings, like numerals refer to like or corresponding parts, and redundant description is omitted. In addition, dimensional ratios in the drawings are not limited to the ratios shown.

A method for producing carbon nanotubes according to the present invention is one performing production of carbon nanotubes by flowing a source gas over a support. Main elements constituting the method for producing carbon nanotubes according to the present invention will be described below for each element.

[Production Method]

The method for producing carbon nanotubes according to the present invention is a method for producing carbon nanotubes in which, using acetylene and a catalyst for producing carbon nanotubes from the acetylene, carbon nanotubes are synthesized on a support in a heated state, disposed in a reactor. This production method comprises the synthesis step of synthesizing carbon nanotubes on the support on which the catalyst is supported by flowing a source gas consisting of acetylene, carbon dioxide, and an inert gas over the support.

In the above source gas, the partial pressure of the acetylene is $1.33 \times 10^1$ to $1.33 \times 10^4$ Pa and the partial pressure of the carbon dioxide is $1.33 \times 10^1$ to $1.33 \times 10^4$ Pa. Preferably, the partial pressure of the acetylene is $6.67 \times 10^1$ to $6.67 \times 10^3$ Pa and the partial pressure of the carbon dioxide is $6.67 \times 10^1$ to $6.67 \times 10^3$ Pa. In addition, the partial pressure ratio of the acetylene to the carbon dioxide (acetylene/carbon dioxide) is in the range of 0.1 to 10. Because of these, long (for example, 300 μm or more) carbon nanotubes can be grown at high speed.

[Reaction Temperature]

In addition, in the method for producing carbon nanotubes according to the present invention, it is preferred to perform the method in a state of maintaining temperature during CNT growth (=reaction temperature=the temperature of the support) at 500° C. or more and 1000° C. or less. It is preferred to perform the method more preferably at 700° C. or more and 900° C. or less. The preferred upper limit of the temperature during CNT growth is set to 1000° C. because it is intended to set the temperature during CNT growth to a temperature at which acetylene is pyrolyzed into soot, or less. In addition, the preferred lower limit of the temperature of the support is set to 500° C. from a viewpoint that the catalyst maintains activity, and carbon nanotubes are more efficiently synthesized.

[Reaction Time]

In the above synthesis step, it is preferred to perform the synthesis of carbon nanotubes for 1 minute or more, and it is more preferred to perform the synthesis of carbon nanotubes for 1 to 100 minutes. Reaction time changes according to the purpose of how long the length of the carbon nanotubes is set. When synthesis time is long, the synthesis of long carbon nanotubes can be performed. This synthesis time is determined by the type of the material, and the required length of the carbon nanotubes, and is not limited to the above-described values.

[Support]

For the support, it is preferred to use ceramics for a material for a reason that heat resistance, corrosion resistance, chemical resistance, mechanical strength properties, and the like are good. For the support, ceramics, such as a known oxide type, nitride type, and silicon carbide type, comprising one or more elements selected from among O, N, C, Si, Al, Zr, and Mg should be used. However, the support is not limited to ceramics, and metal raw materials comprising metals or alloys comprising one or more elements selected from among W, Ta, Mo, Ti, Al, Fe, Co, and Ni, and carbon may be used.

The heating of the support can be performed by means for directly heating or indirectly heating the support. Particularly, it is preferred to use means for disposing the support in a heating furnace heated to high temperature. Specifically, in the present invention, carbon nanotubes are synthesized by a thermal CVD method. This thermal CVD method is a method of forming a thin film by a chemical reaction in the gas phase of a gas or a vapor obtained by vaporizing a liquid source, or on a substrate surface. In the present invention, in this manner, heating the support makes the temperature of the catalyst high, and the source gas comprising acetylene is fed to perform the synthesis of carbon nanotubes.

A method of giving energy causing this chemical reaction, in the form of thermal energy, from a substrate or a reaction container wall is known as the thermal CVD method. This heating method may be one synthesizing carbon nanotubes by heating the entire reactor by a heating furnace. In addition, carbon nanotubes may be synthesized by heating the support by the passage of electric current. In other words, carbon nanotubes may be synthesized by heating the support by the passage of electric current, instead of heating the entire reactor by a heating furnace.

[Carrier]

A catalyst carrier (carrier layer) preferably comprises one or more elements selected from among Si, Al, Mg, Zr, Ti, O, N, C, Mo, Ta, and W. For example, the catalyst carrier should be formed of an oxide, such as $SiO_2$, $Al_2O_3$, or MgO, a nitride, such as $Si_3N_4$ or AlN, or a carbide, such as SiC. Particularly, a complex oxide of $Al_2O_3$—$SiO_2$ is preferred.

The catalyst should be one comprising one or more elements selected from among V, Cr, Mn, Fe, Co, Ni, Cu, Zn, Mo, W, and Au, in a component. In addition, the catalyst is formed on the above-described catalyst carrier (carrier layer) or a support also serving as a catalyst carrier. For the size of the catalyst, it is preferred that diameter is 0.4 nm or more and 15 nm or less. It is preferred that the catalyst is Fe or Co.

As the combination of the catalyst carrier and the catalyst, it is preferred that the catalyst carrier is $Al_2O_3$, and the catalyst is Fe, in terms of the productivity of carbon nanotubes. In addition, in terms of efficiently obtaining carbon nanotubes in which diameter is small, it is preferred that the catalyst carrier is $Al_2O_3$, and the catalyst is Co.

[Feed of Source Gas]

The source gas consists of acetylene, carbon dioxide, and a carrier gas. The acetylene is fed in a gas state into the reactor. For the carrier gas, nitrogen, argon, and the like, which do not influence the production of carbon nanotubes, can be preferably used, and hydrogen and the like may be used.

By flowing the source gas over the support preferably at $1.013 \times 10^3$ Pa (0.01 atmospheres) to $1.013 \times 10^6$ Pa (10 atmospheres), the thermal CVD method is performed. Specifically, by feeding the source gas to the above-described catalyst at $1.013 \times 10^3$ Pa (0.01 atmospheres) to $1.013 \times 10^6$ Pa (10 atmospheres), the synthesis of carbon nanotubes is performed.

In the source gas, the partial pressure of the acetylene is $1.33 \times 10^1$ to $1.33 \times 10^4$ Pa (0.1 to 100 Torr) and the partial pressure of the carbon dioxide is $1.33 \times 10^1$ to $1.33 \times 10^4$ Pa (0.1 to 100 Torr). Preferably, the partial pressure of the acetylene is $6.67 \times 10^1$ to $6.67 \times 10^3$ Pa (0.5 to 50 Torr) and the partial pressure of the carbon dioxide is $6.67 \times 10^1$ to $6.67 \times 10^3$ Pa (0.5 to 50 Torr).

In addition, in the source gas, the partial pressure ratio of the acetylene to the carbon dioxide (acetylene/carbon dioxide) is in the range of 0.1 to 10, preferably 0.15 to 4.0, and more preferably 0.15 to 0.7. By adjusting the above partial pressure and partial pressure ratio of the acetylene and the carbon dioxide in these ranges, long (for example, 300 μm or more) carbon nanotubes can be grown in a short time.

[Product]

The diameter of the synthesized carbon nanotubes should be 0.4 nm or more and 10 nm or less. The diameter of the carbon nanotubes is determined by the type of the catalyst and its size, and is not limited to these values. The length of the carbon nanotubes is determined by synthesis time, and in the case of a use requiring short carbon nanotubes, the synthesis time is made short. In the case of a use requiring long carbon nanotubes, the synthesis time is made long.

The carbon nanotube may be of a single wall or may be composed of a plurality of walls. The carbon nanotube should be composed of 1 or more and 10 or less walls. In the method for producing carbon nanotubes according to the present invention, the production of carbon nanotubes having various structures is possible, and the method is a method suitable for producing SWCNTs. In addition, in the method for producing carbon nanotubes according to the present invention, the production of carbon nanotubes having various structures is possible by controlling the size and component of the catalyst. In conventional production methods, it is difficult to efficiently produce SWCNTs, but with the method for producing carbon nanotubes according to the present invention, it is possible to dramatically improve the production efficiency of SWCNTs.

FIG. 1 is a schematic diagram showing an apparatus for the production of carbon nanotubes when performing the present invention by the thermal CVD method. A reactor 21 is composed of a horizontal cylinder whose one end is closed, and comprises a source gas feed pipe 25 which leads from the outside to the inside of the container. A heater 24 is mounted around the reactor 21. A support substrate 23 on which a catalyst is supported is placed on a quartz boat 22, and disposed in the reactor 21. For a support that supports a catalyst, for example, those in a powder form, a bead form, a honeycomb form, a porous form, a fiber form, a tube form, a wire form, a net form, a lattice form, a sponge form, and a layer form can also be used other than substrates.

[Support of Carrier and Catalyst]

A carrier source and a catalyst source are supported on the support substrate 23 by a sputtering method or the like. It is also possible to allow the support to have the function of a carrier, and at the time, it is not always necessary to support a carrier. Next, the support substrate 23 is mounted in the reactor 21, and heated to a predetermined temperature under a carrier gas flow.

In the production of carbon nanotubes according to the present invention, a well-known combinatorial method in which the amount of a catalyst is continuously changed on a substrate may be used (for example, see S, Noda, et al., Jpn. J. Appl. Phys. 46 (17), 399-401 (2007).). By using this method, a search for optimum catalyst conditions for making CNTs long can be significantly simplified.

[Synthesis of Carbon Nanotubes on Support]

When the source gas comprising acetylene is flowed over the heated support substrate 23 on which the catalyst is supported, as described above, through the source gas feed pipe 25, it is possible to synthesize carbon nanotubes on the support substrate 23.

The preferred embodiment of the present invention has been described above, but the present invention is not limited to the above embodiment in any way.

EXAMPLES

Next, the embodiment of the present invention will be described in detail by Examples.

Example 1

Example 1 of the present invention will be described. Here, a quartz substrate was used as a substrate (support), and a catalyst was sputtered on the substrate.

In catalyst support, a known combinatorial method was used. In other words, Al was obliquely supported on the substrate, and then, a chamber was opened to air. Then, Fe was obliquely supported from a direction orthogonal to Al, to make libraries of Al and Fe. The film thickness of Al was distributed so that the film thickness of Al at both ends of a substrate width of 15 mm was 60 nm to 1 nm, respectively, and the film thickness of Fe was distributed so that the film thickness of Fe at both ends of a substrate width of 15 mm was 4 nm to 0.1 nm, respectively.

The substrate on which the catalyst was supported in this manner was mounted in the reactor shown in FIG. 1. Reaction temperature was 800° C., and a source gas at atmospheric pressure was fed to the reactor with a 1.2 Torr acetylene/7.6 Torr carbon dioxide/argon balance. Reaction time was 30 minutes.

Figure 2:
FIG. 2 is a diagram showing the appearance of carbon nanotubes produced on a substrate.

The length of produced carbon nanotubes was measured by a ruler, and the result is shown in Table 1. The appearance of the produced carbon nanotubes is shown in FIG. 2. In this Example, the combinatorial method was used for the support of the catalyst, and therefore, there is a lateral distribution in the height of the produced carbon nanotubes. FIG. 2 shows the growth height of the carbon nanotubes which were photographed perpendicularly to the oblique direction of Fe from a side of the carbon nanotubes, and the carbon nanotubes grew to a height of 3.5 mm in a region where the carbon nanotubes grew highest (Fe catalyst film thickness 0.6 nm region).

Examples 2 to 7

The carbon nanotubes of Examples 2 to 7 were produced as in Example 1 except that the partial pressure of acetylene and carbon dioxide was changed as shown in Table 1. The length of the produced carbon nanotubes is shown in Table 1.

Comparative Examples 1 to 4

Attempts were made to produce the carbon nanotubes of Comparative Examples 1 to 4 as in Example 1 except that the partial pressure of acetylene and carbon dioxide was changed as shown in Table 1, but the production of carbon nanotubes could not be visually observed.

TABLE 1

| | Reaction temperature (° C.) | Reaction time (min) | Partial pressure Acetylene | Partial pressure Carbon dioxide | Partial pressure ratio (acetylene/ carbon dioxide) | Result (length of carbon nanotubes) |
|---|---|---|---|---|---|---|
| Example 1 | 800 | 30 | 1.2 Torr ($1.60 \times 10^2$ Pa) | 7.6 Torr ($1.01 \times 10^3$ Pa) | 0.16 | 3.5 mm |
| Example 2 | 800 | 30 | 4.8 Torr ($6.40 \times 10^2$ Pa) | 7.6 Torr ($1.01 \times 10^3$ Pa) | 0.63 | 1.0 mm |
| Example 3 | 800 | 30 | 20 Torr ($2.67 \times 10^3$ Pa) | 7.6 Torr ($1.01 \times 10^3$ Pa) | 2.63 | 0.5 mm |
| Example 4 | 800 | 30 | 30 Torr ($4.00 \times 10^3$ Pa) | 7.6 Torr ($1.01 \times 10^3$ Pa) | 3.95 | 0.5 mm |
| Example 5 | 800 | 30 | 4.8 Torr ($6.40 \times 10^2$ Pa) | 30.4 Torr ($4.05 \times 10^3$ Pa) | 0.16 | 1.0 mm |
| Example 6 | 800 | 30 | 10 Torr ($1.33 \times 10^3$ Pa) | 30.4 Torr ($4.05 \times 10^3$ Pa) | 0.33 | 2.0 mm |
| Example 7 | 800 | 30 | 20 Torr ($2.67 \times 10^3$ Pa) | 30.4 Torr ($4.05 \times 10^3$ Pa) | 0.66 | 2.0 mm |
| Comparative Example 1 | 800 | 30 | 1.2 Torr ($1.60 \times 10^2$ Pa) | 30.4 Torr ($4.05 \times 10^3$ Pa) | 0.04 | 0 mm (Impossible to visually confirm) |
| Comparative Example 2 | 800 | 30 | 4.8 Torr ($6.40 \times 10^2$ Pa) | 60.8 Torr ($8.11 \times 10^3$ Pa) | 0.08 | 0 mm (Impossible to visually confirm) |
| Comparative Example 3 | 800 | 30 | 20 Torr ($2.67 \times 10^3$ Pa) | 0 Torr (0 Pa) | ∞ | 0 mm (Impossible to visually confirm) |
| Comparative Example 4 | 800 | 30 | 30 Torr ($4.00 \times 10^3$ Pa) | 0 Torr (0 Pa) | ∞ | 0 mm (Impossible to visually confirm) |

INDUSTRIAL APPLICABILITY

In the method for producing carbon nanotubes according to the present invention, the mass production of long carbon nanotubes is possible, and their production cost can also be largely lowered. Therefore, in the uses of carbon nanotubes produced in the present invention, applications to transparent electrodes, semiconductor thin films, the electrode materials of lithium ion batteries, the electrode materials of fuel cells, the electrode materials of electric double layer capacitors, filler materials for composite polymers, electron emission guns, field emission displays, microscope probes, gas occlusion materials, and the like receive attention. Particularly, in the uses of single-walled carbon nanotubes produced in the present invention, applications to transparent electrodes, the electrode materials of lithium ion batteries, the electrode materials of electric double layer capacitors, and the like receive attention.

REFERENCE SIGNS LIST

21 . . . reactor, 22 . . . quartz boat, 23 . . . support substrate, 24 . . . heater, 25 . . . source gas feed pipe.

The invention claimed is:
1. A method for producing carbon nanotubes in which, using acetylene and a catalyst for producing carbon nano- tubes from the acetylene, the carbon nanotubes are synthesized on a support in a heated state, disposed in a reactor, the method comprising a synthesis step of synthesizing the carbon nanotubes on the support on which the catalyst is supported by flowing a source gas consisting of carbon dioxide, an inert gas and the acetylene over the support, wherein in the source gas, a partial pressure of the acetylene is $1.33 \times 10^1$ to $1.33 \times 10^4$ Pa, a partial pressure of the carbon dioxide is $1.33 \times 10^1$ to $1.33 \times 10^4$ Pa, and a partial pressure ratio of the acetylene to the carbon dioxide (acetylene/carbon dioxide) is 0.1 or higher and less than 0.5.

2. The method for producing carbon nanotubes according to claim 1, wherein in the source gas, the partial pressure of the acetylene is $6.67 \times 10^1$ to $6.67 \times 10^3$ Pa, and the partial pressure of the carbon dioxide is $6.67 \times 10^1$ to $6.67 \times 10^3$ Pa.

3. The method for producing carbon nanotubes according to claim 1, wherein in the synthesis step, the synthesis of the carbon nanotubes is performed for 1 minute or more.

4. The method for producing carbon nanotubes according to claim 1, wherein the support is a structure having one shape selected from among a powder form, a bead form, a honeycomb form, a porous form, a fiber form, a tube form, a wire form, a net form, a lattice form, a sponge form, a plate form, and a layer form.

5. A method for producing carbon nanotubes in which, using acetylene and a catalyst for producing carbon nanotubes from the acetylene, the carbon nanotubes are synthesized on a support in a heated state, disposed in a reactor, the method comprising a synthesis step of synthesizing the carbon nanotubes on the support on which the catalyst is supported by flowing a source gas consisting of carbon dioxide, an inert gas and the acetylene over the support, wherein in the source gas, a partial pressure of the acetylene is $1.33 \times 10^1$ to $1.33 \times 10^4$ Pa, a partial pressure of the carbon dioxide is $1.33 \times 10^1$ to $1.33 \times 10^4$ Pa, and a partial pressure ratio of the acetylene to the carbon dioxide (acetylene/carbon dioxide) is in the range of 0.1 to 0.33.

6. The method for producing carbon nanotubes according to claim 5, wherein in the source gas, the partial pressure of the acetylene is $6.67 \times 10^1$ to $6.67 \times 10^3$ Pa, and the partial pressure of the carbon dioxide is $6.67 \times 10^1$ to $6.67 \times 10^3$ Pa.

7. The method for producing carbon nanotubes according to claim 5, wherein in the synthesis step, the synthesis of the carbon nanotubes is performed for 1 minute or more.

8. The method for producing carbon nanotubes according to claim 5, wherein the support is a structure having one shape selected from among a powder form, a bead form, a honeycomb form, a porous form, a fiber form, a tube form, a wire form, a net form, a lattice form, a sponge form, a plate form, and a layer form.

\* \* \* \* \*